US009361299B2

(12) United States Patent
Bodin et al.

(10) Patent No.: US 9,361,299 B2
(45) Date of Patent: Jun. 7, 2016

(54) RSS CONTENT ADMINISTRATION FOR RENDERING RSS CONTENT ON A DIGITAL AUDIO PLAYER

(75) Inventors: William K. Bodin, Austin, TX (US); David Jaramillo, Lake Worth, FL (US); Jerry W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2138 days.

(21) Appl. No.: 11/372,317

(22) Filed: Mar. 9, 2006

(65) Prior Publication Data

US 2007/0213857 A1    Sep. 13, 2007

(51) Int. Cl.
*G06F 17/00* (2006.01)
*G06F 17/30* (2006.01)
*H04L 29/08* (2006.01)

(52) U.S. Cl.
CPC .... *G06F 17/30038* (2013.01); *G06F 17/30017* (2013.01); *H04L 67/02* (2013.01)

(58) Field of Classification Search
CPC ............... G06F 17/30017; G06F 17/30038; H04L 67/02
USPC ................ 715/202, 210, 230, 234, 716, 738; 709/203, 206, 218, 223, 227, 231
See application file for complete search history.

(56) References Cited

U.S. PATENT DOCUMENTS

| 5,819,220 A | 10/1998 | Sarukkai et al. |
| 5,892,825 A | 4/1999 | Mages et al. |
| 5,901,287 A | 5/1999 | Bull et al. |
| 5,911,776 A | 6/1999 | Guck |

(Continued)

FOREIGN PATENT DOCUMENTS

| JP | 2004312208 | 11/2004 |
| JP | 2004312208 A | 11/2004 |

(Continued)

OTHER PUBLICATIONS

OdioGo, Screen Dumps from www.odiogo.com web site, 11 pages total, archive date Oct. 23, 2005, downloaded from WayBack Machine, <http://web.archive.org/web/20051023004244/www.odiogo.com/*>.*

(Continued)

*Primary Examiner* — Cesar Paula
*Assistant Examiner* — James H Blackwell
(74) *Attorney, Agent, or Firm* — Brevetto Law Group

(57) ABSTRACT

Methods, systems, and computer program products are provided for RSS content administration for rendering RSS content on a digital audio player. Embodiments include retrieving, through an RSS feed, RSS content; extracting text from the RSS content; creating a media file; and storing the extracted text of the RSS content as metadata associated with the media file. Embodiments also typically include extracting one or more images from the RSS content; and storing the extracted images as metadata associated with the media file. Embodiments also typically include extracting text from the RSS content for audio rendering on the digital audio player; converting the text to speech; and recording the speech in the audio portion of the media file. Many embodiments also include storing the media file on a digital audio player; displaying the metadata describing the media file; and playing the audio portion containing the speech.

13 Claims, 6 Drawing Sheets

(56) References Cited

U.S. PATENT DOCUMENTS

| | | |
|---|---|---|
| 6,032,260 A | 2/2000 | Sasmazel et al. |
| 6,061,718 A | 5/2000 | Nelson |
| 6,141,693 A | 10/2000 | Perlman et al. |
| 6,178,511 B1 | 1/2001 | Cohen et al. |
| 6,219,638 B1 | 4/2001 | Padmanabhan |
| 6,240,391 B1 | 5/2001 | Ball et al. |
| 6,266,649 B1 | 7/2001 | Linden et al. |
| 6,311,194 B1 | 10/2001 | Sheth et al. |
| 6,343,329 B1 | 1/2002 | Landgraf |
| 6,463,440 B1 | 10/2002 | Hind et al. |
| 6,519,617 B1 | 2/2003 | Wanderski et al. |
| 6,771,743 B1 | 8/2004 | Butler et al. |
| 6,912,691 B1 | 6/2005 | Dodrill et al. |
| 6,944,591 B1 | 9/2005 | Raghunandan |
| 6,965,569 B1 | 11/2005 | Carolan et al. |
| 6,975,989 B2 | 12/2005 | Sasaki |
| 6,976,082 B1 | 12/2005 | Ostermann et al. |
| 6,981,023 B1 | 12/2005 | Hamilton |
| 6,993,476 B1 | 1/2006 | Dutta et al. |
| 7,039,643 B2 | 5/2006 | Sena et al. |
| 7,046,772 B1 | 5/2006 | Moore et al. |
| 7,062,437 B2 | 6/2006 | Kovales et al. |
| 7,120,702 B2 | 10/2006 | Huang et al. |
| 7,130,850 B2 | 10/2006 | Russell-Falla et al. |
| 7,171,411 B1 | 1/2007 | Lewis et al. |
| 7,313,528 B1 | 12/2007 | Miller |
| 7,356,470 B2 | 4/2008 | Roth et al. |
| 7,366,712 B2 | 4/2008 | He et al. |
| 7,454,346 B1 | 11/2008 | Dodrill et al. |
| 7,546,288 B2 * | 6/2009 | Springer et al. |
| 7,657,006 B2 | 2/2010 | Woodring |
| 7,849,159 B2 * | 12/2010 | Elman et al. ............ 709/219 |
| 2001/0027396 A1 | 10/2001 | Sato |
| 2001/0040900 A1 | 11/2001 | Salmi et al. |
| 2001/0047349 A1 | 11/2001 | Easty et al. |
| 2001/0049725 A1 | 12/2001 | Kosuge |
| 2001/0054074 A1 | 12/2001 | Hayashi |
| 2002/0013708 A1 | 1/2002 | Walker et al. |
| 2002/0032564 A1 | 3/2002 | Ehsani et al. |
| 2002/0032776 A1 | 3/2002 | Hasegawa et al. |
| 2002/0054090 A1 | 5/2002 | Silva et al. |
| 2002/0062216 A1 | 5/2002 | Guenther et al. |
| 2002/0062393 A1 | 5/2002 | Borger |
| 2002/0083013 A1 | 6/2002 | Rollins et al. |
| 2002/0095292 A1 | 7/2002 | Mittal et al. |
| 2002/0178007 A1 | 11/2002 | Slotznick et al. |
| 2002/0184028 A1 | 12/2002 | Sasaki |
| 2002/0194286 A1 | 12/2002 | Matsuura et al. |
| 2002/0194480 A1 * | 12/2002 | Nagao ............ 713/176 |
| 2002/0198720 A1 | 12/2002 | Takagi et al. |
| 2003/0028380 A1 | 2/2003 | Freeland et al. |
| 2003/0033331 A1 | 2/2003 | Sena et al. |
| 2003/0051083 A1 | 3/2003 | Striemer |
| 2003/0055868 A1 | 3/2003 | Fletcher et al. |
| 2003/0103606 A1 | 6/2003 | Rhie et al. |
| 2003/0110272 A1 | 6/2003 | du Castel et al. |
| 2003/0115056 A1 | 6/2003 | Gusler et al. |
| 2003/0115064 A1 | 6/2003 | Gusler et al. |
| 2003/0126293 A1 | 7/2003 | Bushey |
| 2003/0132953 A1 | 7/2003 | Johnson et al. |
| 2003/0139144 A1 | 7/2003 | Kitajima |
| 2003/0158737 A1 * | 8/2003 | Csicsatka ............ 704/273 |
| 2003/0160770 A1 | 8/2003 | Zimmerman |
| 2003/0167234 A1 | 9/2003 | Bodmer et al. |
| 2003/0172066 A1 | 9/2003 | Cooper et al. |
| 2003/0188255 A1 | 10/2003 | Shimizu et al. |
| 2003/0229847 A1 | 12/2003 | Kim |
| 2004/0003394 A1 | 1/2004 | Ramaswamy |
| 2004/0005040 A1 | 1/2004 | Owens |
| 2004/0034653 A1 | 2/2004 | Maynor et al. |
| 2004/0041835 A1 | 3/2004 | Lu |
| 2004/0046778 A1 * | 3/2004 | Niranjan et al. ............ 345/716 |
| 2004/0068552 A1 | 4/2004 | Kotz et al. |
| 2004/0088349 A1 | 5/2004 | Beck et al. |
| 2004/0201609 A1 * | 10/2004 | Obrador ............ 345/723 |
| 2004/0254851 A1 | 12/2004 | Himeno et al. |
| 2005/0002503 A1 | 1/2005 | Owens |
| 2005/0015254 A1 | 1/2005 | Beaman |
| 2005/0045373 A1 | 3/2005 | Born |
| 2005/0071780 A1 | 3/2005 | Muller et al. |
| 2005/0076365 A1 | 4/2005 | Popov et al. |
| 2005/0108521 A1 | 5/2005 | Silhavy et al. |
| 2005/0191994 A1 | 9/2005 | May |
| 2005/0192061 A1 | 9/2005 | May |
| 2005/0203959 A1 * | 9/2005 | Muller et al. ............ 707/104.1 |
| 2005/0226217 A1 | 10/2005 | Logemann |
| 2005/0232242 A1 | 10/2005 | Karaoguz et al. |
| 2005/0251513 A1 | 11/2005 | Tenazas |
| 2006/0007820 A1 * | 1/2006 | Adams et al. ............ 369/47.12 |
| 2006/0008258 A1 | 1/2006 | Kawana et al. |
| 2006/0020662 A1 | 1/2006 | Robinson |
| 2006/0031364 A1 | 2/2006 | Hamilton |
| 2006/0048212 A1 | 3/2006 | Tsuruoka et al. |
| 2006/0050794 A1 | 3/2006 | Tan et al. |
| 2006/0052089 A1 | 3/2006 | Khurana et al. |
| 2006/0075224 A1 | 4/2006 | Tao |
| 2006/0095848 A1 * | 5/2006 | Naik ............ 715/716 |
| 2006/0114987 A1 | 6/2006 | Roman |
| 2006/0123082 A1 | 6/2006 | Digate et al. |
| 2006/0136449 A1 | 6/2006 | Parker et al. |
| 2006/0140360 A1 | 6/2006 | Crago et al. |
| 2006/0149781 A1 | 7/2006 | Blankinship |
| 2006/0155698 A1 | 7/2006 | Vayssiere |
| 2006/0159109 A1 | 7/2006 | Lamkin et al. |
| 2006/0168507 A1 | 7/2006 | Hansen |
| 2006/0173985 A1 | 8/2006 | Moore |
| 2006/0184679 A1 | 8/2006 | Izdepski et al. |
| 2006/0190616 A1 | 8/2006 | Mayerhofer et al. |
| 2006/0193450 A1 | 8/2006 | Flynt |
| 2006/0195512 A1 | 8/2006 | Rogers et al. |
| 2006/0195540 A1 | 8/2006 | Hamilton |
| 2006/0206533 A1 | 9/2006 | MacLaurin et al. |
| 2006/0218187 A1 | 9/2006 | Plastina et al. |
| 2006/0224739 A1 | 10/2006 | Anantha |
| 2006/0233327 A1 | 10/2006 | Roberts et al. |
| 2006/0265503 A1 * | 11/2006 | Jones et al. ............ 709/227 |
| 2006/0282317 A1 | 12/2006 | Rosenberg |
| 2006/0288011 A1 | 12/2006 | Gandhi et al. |
| 2007/0027958 A1 | 2/2007 | Haslam |
| 2007/0043759 A1 | 2/2007 | Bodin |
| 2007/0061229 A1 | 3/2007 | Ramer et al. |
| 2007/0061266 A1 | 3/2007 | Moore et al. |
| 2007/0067429 A1 | 3/2007 | Jain et al. |
| 2007/0073728 A1 | 3/2007 | Klein et al. |
| 2007/0077921 A1 | 4/2007 | Hayashi et al. |
| 2007/0078655 A1 | 4/2007 | Semkow et al. |
| 2007/0083540 A1 | 4/2007 | Gundla et al. |
| 2007/0091206 A1 | 4/2007 | Bloebaum |
| 2007/0100836 A1 | 5/2007 | Eichstaedt et al. |
| 2007/0112844 A1 | 5/2007 | Tribble et al. |
| 2007/0118426 A1 | 5/2007 | Barnes, Jr. |
| 2007/0124458 A1 | 5/2007 | Kumar |
| 2007/0124802 A1 | 5/2007 | Anton et al. |
| 2007/0130589 A1 | 6/2007 | Davis et al. |
| 2007/0147274 A1 | 6/2007 | Vasa et al. |
| 2007/0174326 A1 | 7/2007 | Schwartz et al. |
| 2007/0191008 A1 | 8/2007 | Bucher et al. |
| 2007/0192327 A1 | 8/2007 | Bodin |
| 2007/0192674 A1 | 8/2007 | Bodin |
| 2007/0192683 A1 | 8/2007 | Bodin |
| 2007/0192684 A1 | 8/2007 | Bodin et al. |
| 2007/0206738 A1 | 9/2007 | Patel |
| 2007/0208687 A1 | 9/2007 | O'Conor et al. |
| 2007/0213857 A1 | 9/2007 | Bodin |
| 2007/0213986 A1 | 9/2007 | Bodin |
| 2007/0214147 A1 | 9/2007 | Bodin et al. |
| 2007/0214148 A1 | 9/2007 | Bodin |
| 2007/0214149 A1 | 9/2007 | Bodin |
| 2007/0214485 A1 | 9/2007 | Bodin |
| 2007/0220024 A1 | 9/2007 | Putterman et al. |
| 2007/0253699 A1 | 11/2007 | Yen et al. |
| 2007/0276837 A1 | 11/2007 | Bodin et al. |
| 2007/0276865 A1 | 11/2007 | Bodin et al. |
| 2007/0276866 A1 | 11/2007 | Bodin et al. |

(56) References Cited

U.S. PATENT DOCUMENTS

| | | |
|---|---|---|
| 2007/0277088 A1 | 11/2007 | Bodin |
| 2007/0277233 A1 | 11/2007 | Bodin |
| 2008/0034278 A1 | 2/2008 | Tsou et al. |
| 2008/0052415 A1 | 2/2008 | Kellerman et al. |
| 2008/0082576 A1 | 4/2008 | Bodin |
| 2008/0082635 A1 | 4/2008 | Bodin |
| 2008/0161948 A1 | 7/2008 | Bodin |
| 2008/0162131 A1 | 7/2008 | Bodin |
| 2008/0275893 A1 | 11/2008 | Bodin et al. |
| 2009/0132453 A1 | 5/2009 | Hangartner |

FOREIGN PATENT DOCUMENTS

| | | |
|---|---|---|
| JP | 2005149490 | 6/2005 |
| JP | 2005149490 A | 6/2005 |
| JP | 2007011893 | 1/2007 |
| JP | 2007011893 A | 1/2007 |
| WO | WO 0182139 | 11/2001 |
| WO | WO 2005/106846 | 11/2005 |

OTHER PUBLICATIONS

N. Bradbury, "FeedDemon version 1.0," (c) Dec. 18, 2003, bradsoft.com, series of 11 screen dumps illustrating aspects of the software, 11 pages total numbered 1-11 of 11.*
Heslop et al.,"Microsoft Office Word 2003 Bible," © 2003, Wiley Publishing Inc., pp. 39-30, 39, and 505-517.*
Office Action Dated Jun. 23, 2009 in U.S. Appl. No. 11/352,680.
Office Action Dated Jul. 8, 2009 in U.S. Appl. No. 11/372,317.
Final Office Action Dated Jul. 22, 2009 in U.S. Appl. No. 11/536,733.
Office Action Dated Jul. 9, 2009 in U.S. Appl. No. 11/420,017.
Office Action Dated Jul. 17, 2009 in U.S. Appl. No. 11/536,781.
Office Action Dated Jul. 23, 2009 in U.S. Appl. No. 11/420,014.
Final Office Action Dated Jul. 21, 2009 in U.S. Appl. No. 11/420,018.
Buchana et al., "Representing Aggregated Works in the Digital Library", ACM, 2007, pp. 247-256.
Office Action, U.S. Appl. No. 11/352,760, Sep. 16, 2010.
Office Action, U.S. Appl. No. 11/352,680, Jun. 10, 2010.
Final Office Action, U.S. Appl. No. 11/352,680, Sep. 7, 2010.
Office Action, U.S. Appl. No. 11/352,679, May 28, 2010.
Final Office Action, U.S. Appl. No. 11/352,679, Nov. 15, 2010.
Office Action, U.S. Appl. No. 11/372,317, Sep. 23, 2010.
Final Office Action, U.S. Appl. No. 11/372,329, Nov. 6, 2009.
Office Action, U.S. Appl. No. 11/372,319, Apr. 21, 2010.
Final Office Action, U.S. Appl. No. 11/372,319, Jul. 2, 2010.
Final Office Action, U.S. Appl. No. 11/420,014, Apr. 3, 2010.
Final Office Action, U.S. Appl. No. 11/420,017, Sep. 23, 2010.
Final Office Action, U.S. Appl. No. 11/619,216, Jun. 25, 2010.
Final Office Action, U.S. Appl. No. 11/619,236, Oct. 22, 2010.
Office Action, U.S. Appl. No. 12/178,448, Apr. 2, 2010.
Final Office Action, U.S. Appl. No. 12/178,448, Sep. 14, 2010.
Buchanan et al.;"Representing Aggregated Works in the Digital Library", ACM, 2007, pp. 247-256.
U.S. Appl. No. 11/352,760, filed Feb. 2006, Bodin, et al.
U.S. Appl. No. 11/352,824, filed Feb. 2006, Bodin, et al.
U.S. Appl. No. 11/352,680, filed Feb. 2006, Bodin, et al.
U.S. Appl. No. 11,352,679, filed Feb. 2006, Bodin et al.
U.S. Appl. No. 11/372,323, filed Mar. 2006, Bodin et al.
U.S. Appl. No. 11/372,318, filed Mar. 2006, Bodin et al.
U.S. Appl. No. 11/372,319, filed Mar. 2006, Bodin et al.
U.S. Appl. No. 11/536,781, filed Sep. 2006, Bodin et al.
U.S. Appl. No. 11/420,014, filed May 2006, Bodin et al.
U.S. Appl. No. 11/420,015, filed May 2006, Bodin et al.
U.S. Appl. No. 11/420,016, filed May 2006, Bodin et al.
U.S. Appl. No. 11/420,017, filed May 2006, Bodin et al.
U.S. Appl. No. 11/420,018, filed May 2006, Bodin et al.
U.S. Appl. No. 11/536,733, filed Sep. 2006, Bodin et al.
U.S. Appl. No. 11/619,216, filed Jan. 2007, Bodin et al.
U.S. Appl. No. 11/619,253, filed Jan. 2007, Bodin, et al.
U.S. Appl. No. 12/178,448, filed Jul. 2008, Bodin, et al.
Office Action Dated Apr. 15, 2009 in U.S. Appl. No. 11/352,760.
Final Office Action Dated Nov. 16, 2009 in U.S. Appl. No. 11/352,760.
Notice of Allowance Dated Jun. 5, 2008 in U.S. Appl. No. 11/352,824.
Office Action Dated Jan. 22, 2008 in U.S. Appl. No. 11/352,824.
Final Office Action Dated Dec. 21, 2009 in U.S. Appl. No. 11/352,680.
Office Action Dated Apr. 30, 2009 in U.S. Appl. No. 11/352,679.
Final Office Action Dated Oct. 29, 2009 in U.S. Appl. No. 11/352,679.
Office Action Dated Oct. 28, 2008 in U.S. Appl. No. 11/372,323.
Office Action Dated Mar. 18, 2008 in U.S. Appl. No. 11/372,318.
Final Office Action Dated Jul. 9, 2008 in U.S. Appl. No. 11/372,318.
Final Office Action Dated Nov. 6, 2009 in U.S. Appl. No. 11/372,329.
Office Action Dated Feb. 25, 2009 in U.S. Appl. No. 11/372,325.
Office Action Dated Feb. 27, 2009 in U.S. Appl. No. 11/372,329.
Final Office Action Dated Jan. 15, 2010 in U.S. Appl. No. 11/536,781.
Office Action Dated Mar. 20, 2008 in U.S. Appl. No. 11/420,015.
Final Office Action Dated Sep. 3, 2008 in U.S. Appl. No. 11/420,015.
Office Action Dated Dec. 2, 2008 in U.S. Appl. No. 11/420,015.
Office Action Dated Mar. 3, 2008 in U.S. Appl. No. 11/420,016.
Final Office Action Dated Aug. 29, 2008 in U.S. Appl. No. 11/420,016.
Final Office Action Dated Dec. 31, 2009 in U.S. Appl. No. 11/420,017.
Office Action Dated Mar. 21, 2008 in U.S. Appl. No. 11/420,018.
Final Office Action Dated Aug. 29, 2008 in U.S. Appl. No. 11/420,018.
Office Action Dated Dec. 3, 2008 in U.S. Appl. No. 11/420,018.
Office Action Dated Dec. 30, 2008 in U.S. Appl. No. 11/536,733.
Office Action Dated Jan. 26, 2010 in U.S. Appl. No. 11/619,216.
Office Action Dated Apr. 2, 2009 in U.S. Appl. No. 11/619,253.

* cited by examiner

RSS CONTENT ADMINISTRATION FOR RENDERING RSS CONTENT ON A DIGITAL AUDIO PLAYER

BACKGROUND OF THE INVENTION

1. Field of the Invention

The field of the invention is data processing, or, more specifically, methods, systems, and products for RSS content administration for rendering RSS content on a digital audio player.

2. Description of Related Art

Many conventional digital audio players include display screens for displaying metadata associated with the media files supported by the digital audio players. Such digital audio players are often lightweight and portable making the digital audio players user friendly. Despite the fact that the digital audio players are lightweight, portable, and include display screens, such digital media players do not support providing conventional RSS ('Really Simple Syndication') content because the digital audio players only support playing media files. There is therefore an ongoing need for RSS content administration for rendering RSS content on a digital audio player.

SUMMARY OF THE INVENTION

Methods, systems, and computer program products are provided for RSS administration for rendering RSS content on a digital audio player. Embodiments include retrieving, through an RSS feed, RSS content; extracting text from the RSS content; creating a media file; and storing the extracted text of the RSS content as metadata associated with the media file. Embodiments also typically include extracting one or more images from the RSS content and storing the extracted images as metadata associated with the media file. Embodiments also typically include extracting text from the RSS content for audio rendering on the digital audio player; converting the text to speech; and recording the speech in the audio portion of the media file. Many embodiments also include storing the media file on a digital audio player; displaying the metadata describing the media file; and playing the audio portion containing the speech.

Creating a media file may be carried out by creating an MPEG file and storing the extracted text of the RSS content as metadata describing the media file may be carried out by inserting the extracted text in the MPEG file. Inserting the extracted text in the MPEG file may be carried out by inserting the extracted text in an ID3 tag in the MPEG file.

Storing the extracted text of the RSS content as metadata describing the media file may be carried out by storing the extracted text in a metadata file associated with the media file. The metadata file may be an eXtenxible markup language ('XML') file.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
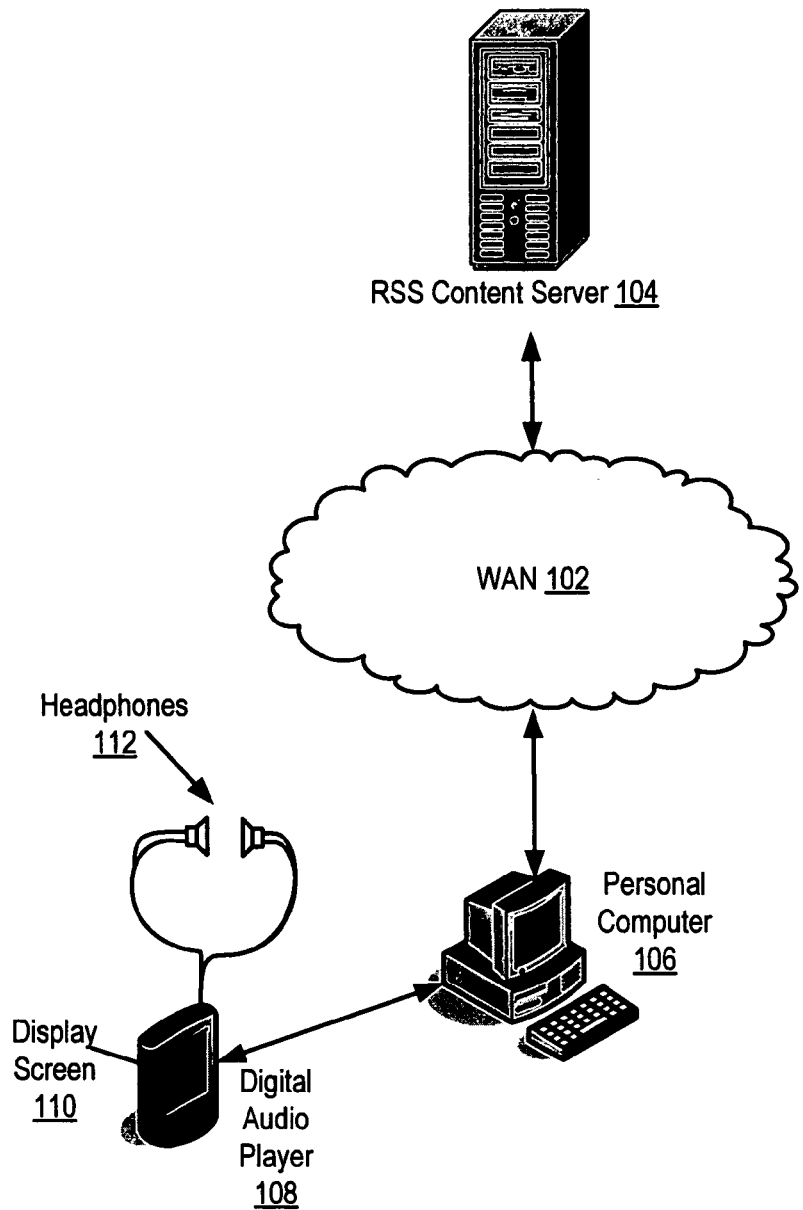
FIG. 1 sets forth a network diagram illustrating an exemplary system for RSS content administration for rendering RSS content on a digital audio player according to embodiments of the present invention.

Exemplary methods, systems, and products for RSS content administration for rendering RSS content on a digital audio player according to embodiments of the present invention are described with reference to the accompanying drawings, beginning with FIG. 1. FIG. 1 sets forth a network diagram illustrating an exemplary system for RSS content administration for rendering RSS content on a digital audio player according to embodiments of the present invention. The system of FIG. 1 is capable of administering RSS content for rendering RSS content on a display screen of a digital audio player. The system of FIG. 1 is also capable of administering RSS content for rendering portions of the RSS content on a display screen of a digital audio player and portions of the RSS content as audio.

The system of FIG. 1 includes an RSS content server (104) coupled for data communications with a personal computer (106) through a wide area network (102) ('WAN'). RSS ('Really Simple Syndication') is a broad term describing a family of XML file formats for web syndication used by news websites, weblogs, and other content providers. The abbreviation is often used to refer to the following exemplary standards: Rich Site Summary (RSS 0.91), RDF Site Summary (RSS 0.9, 1.0 and 1.1), and Really Simple Syndication (RSS 2.0).

In the example of FIG. 1, the RSS content server (104) provides access to content through an RSS feed delivered to an RSS aggregator installed on the personal computer (106). An RSS feed is typically an XML file that contains summaries and other metadata describing content available on the RSS content server (104) together with links to the full content on the RSS content server (104). A user may then view the RSS feed and access content delivered through the RSS feed through a browser installed on the personal computer.

The personal computer (106) of FIG. 1 is also capable of supporting an RSS content administration module that operates generally to administer RSS content administration for rendering RSS content on a digital audio player by retrieving, through an RSS feed, RSS content; extracting text from the RSS content; extracting one or more images from the RSS content; creating a media file; storing the extracted text of the RSS content as metadata associated with the media file; storing the extracted images as metadata associated with the media file, storing the media file on a digital audio player for displaying the metadata containing the extracted text of the RSS content. The RSS administration module is also capable generally of extracting text from the RSS content for audio rendering on the digital audio player; converting the text to speech; recording the speech in the audio portion of the media file; and storing the media file on a digital audio player for displaying the metadata describing the media file and for playing the audio portion containing the speech.

The system of FIG. 1 also includes a digital audio player (108). A digital audio player of FIG. 1 is capable of playing media files such as for example, MPEG files, AAC compressed .mp4 files, and others as will occur to those of skill in the art. The digital audio player of FIG. 1 also includes a display screen (110) capable of displaying information stored as metadata associated with media files of the file types supported by the digital audio player. The digital audio player also includes headphones (112) for audio presentation of the audio portions of media files supported by the digital audio player.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

RSS content administration for rendering RSS content on a digital audio player in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful RSS content administration for rendering RSS content on a digital audio player according to embodiments of the present invention. The computer (152) of FIG. 2 includes at least one computer processor (156) or 'CPU' as well as random access memory (168) ('RAM') which is connected through a system bus (160) to processor (156) and to other components of the computer.

Stored in RAM (168) is an operating system (154). Operating systems useful in computers according to embodiments of the present invention include UNIX™, Linux™, Microsoft XP™, AIX™, IBM's i5/OS™, and others as will occur to those of skill in the art.

Figure 2:
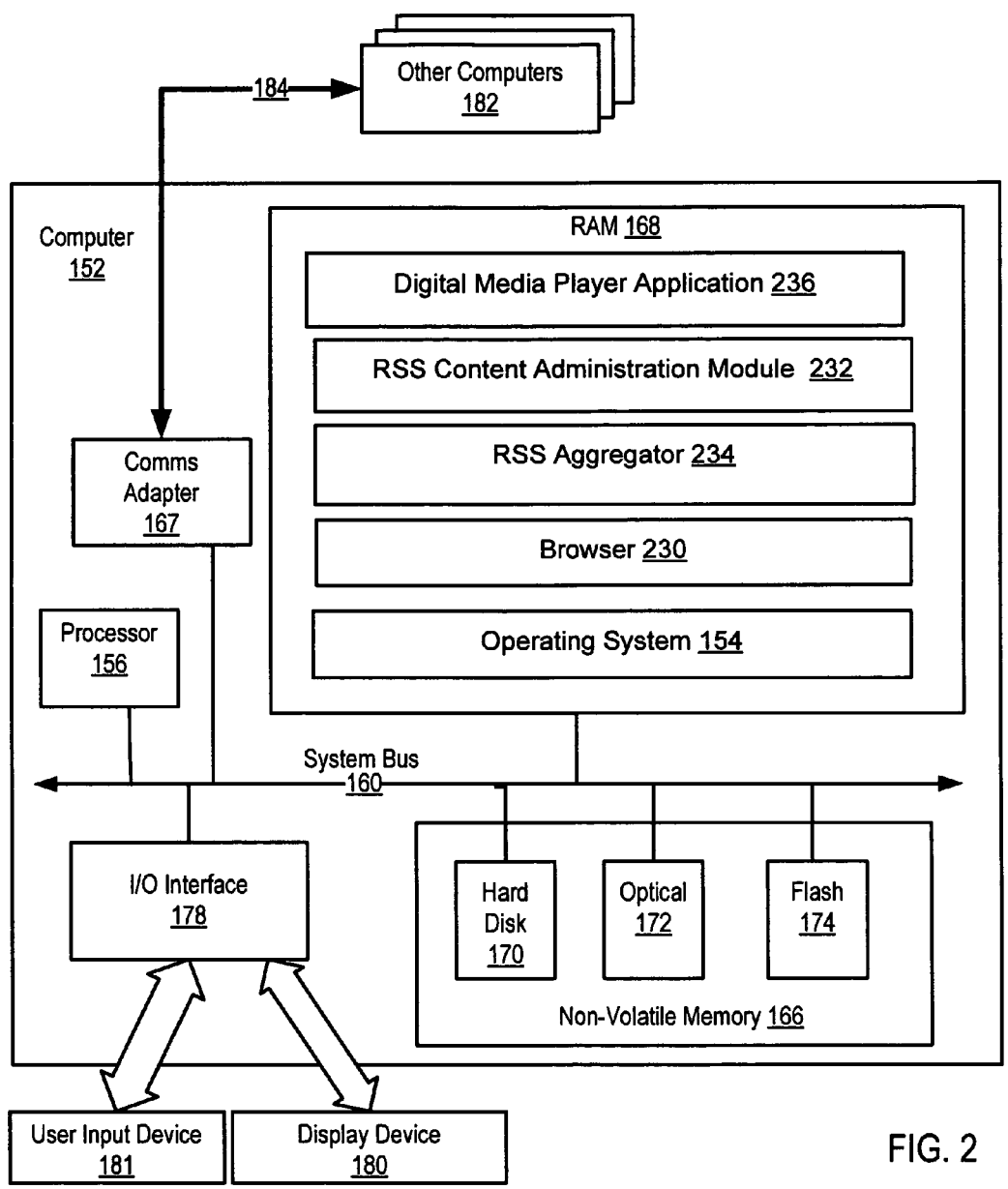
FIG. 2 sets forth a block diagram of automated computing machinery comprising an exemplary computer useful RSS content administration for rendering RSS content on a digital audio player according to embodiments of the present invention.

Also stored in RAM (168) is a browser (230). The browser (230) of FIG. 2 is an application capable of retrieving web pages such as RSS content available through RSS feeds and displaying the retrieved web pages. Also stored in RAM (168) is an RSS aggregator (234), computer program instructions for retrieving RSS feeds from an RSS content provider.

Also stored in RAM (168) is an RSS content administration module (232). The RSS content administration module (232) comprises computer program instructions capable of administering RSS content for rendering RSS content on a digital audio player by retrieving, through an RSS feed, RSS content; extracting text from the RSS content; creating a media file; and storing the extracted text of the RSS content as metadata associated with the media file. The RSS content administration module (232) is also capable of extracting text from the RSS content for audio rendering on the digital audio player; converting the text to speech; and recording the speech in the audio portion of the media file.

Also stored in RAM (168) is a digital media player application (236). A digital media player application (236) is an application that manages media content such as audio files and video files. Such digital media player applications are typically capable of transferring media files to a digital audio player. Examples of digital media player applications include Music Match™, iTunes® and others as will occur to those of skill in the art.

The operating system (154), browser (230), RSS aggregator (234), RSS content administration module (232), and digital media player application (236) in the example of FIG. 2 are shown in RAM (168), but many components of such software may be stored in non-volatile memory (166) also.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182) such as, for example, an RSS content server. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in implementing embodiments of the present invention include modems for wired dial-up communications, Ethernet (IEEE 802.3) adapters for wired network communications, and 802.11b adapters for wireless network communications.

RSS content administration for rendering RSS content on a digital audio player may include both administering RSS content for rendering RSS content on a display screen of a digital audio player and administering RSS content for rendering portions of the RSS content on a display screen of a digital audio player and portions of the RSS content as audio. For further explanation, FIG. 3 sets forth a flow chart illustrating an exemplary method for RSS content administration for rendering RSS content on the display screen of a digital audio player. The method of FIG. 3 includes retrieving (302), through an RSS feed, RSS content (304). Retrieving (302), through an RSS feed, RSS content (304) may be carried out by invoking one or more hyperlinks provided in the RSS feed and retrieving an RSS web page or other markup document containing the RSS content.

Figure 3:
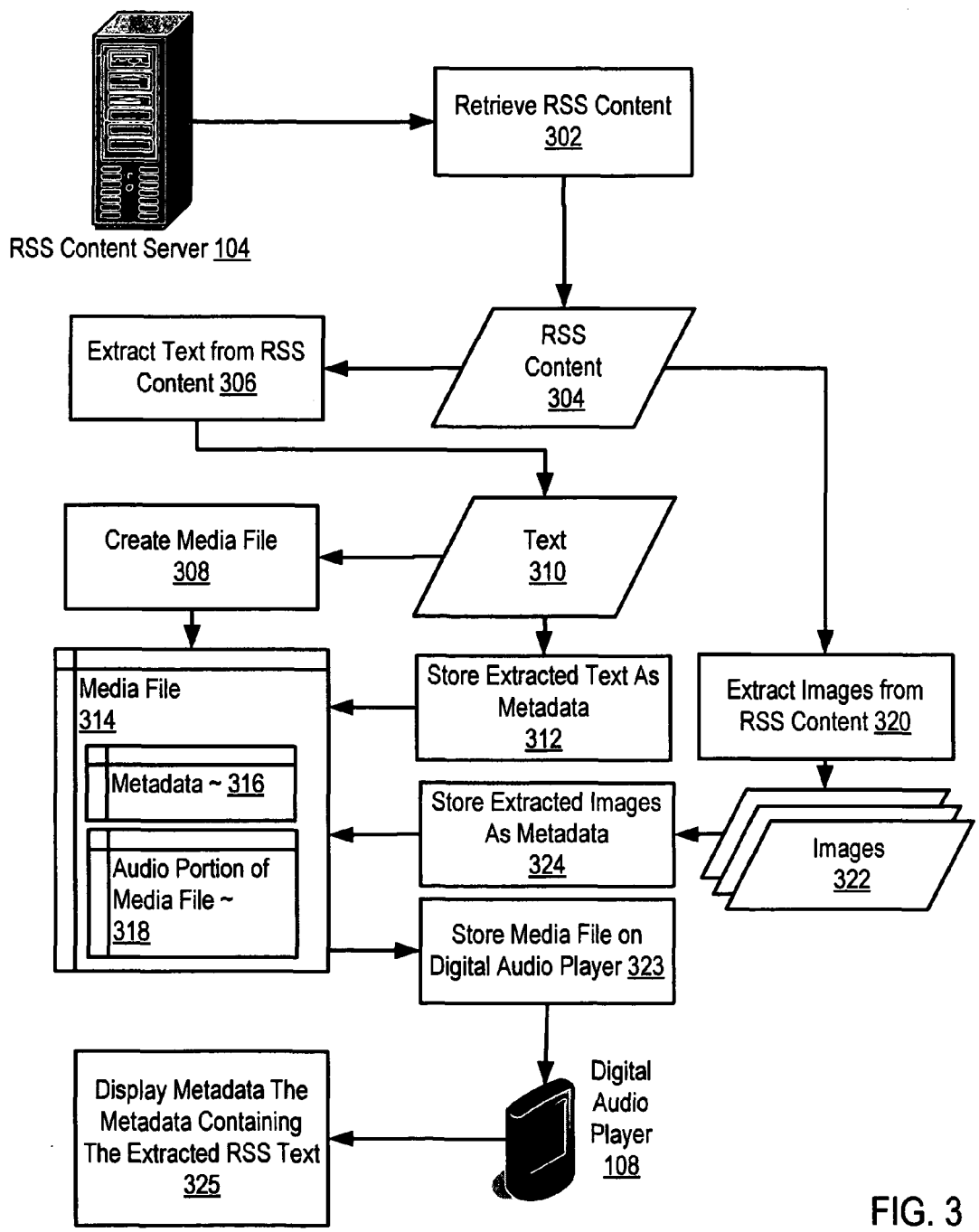
FIG. 3 sets forth a flow chart illustrating an exemplary method for RSS content administration for rendering RSS content on a digital audio player.

The method of FIG. 3 includes extracting (306) text (310) from the RSS content (304). As discussed above, RSS content is typically presented in a web page or other markup document accessible through a browser. Such a web page or markup document therefore includes display text and images for display to a user and markup dictating the presentation of the content. Extracting (306) text (310) from the RSS content therefore may be carried out by retrieving display text from a web page or markup document. Such extracted display text implements some or all of the text content of the RSS feed.

The method of FIG. 3 also includes creating (308) a media file (314). Examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art. Creating a media file typically includes creating a media file that is supported by a digital audio player upon which RSS content is to be rendered.

The method of FIG. 3 also includes storing (312) the extracted text (310) of the RSS content (304) as metadata (316) associated with the media file (314). Storing (312) the extracted text (310) of the RSS content (304) as metadata (316) associated with the media file (314) may be carried out by inserting the extracted text in the media file itself, such as by inserting the extracted text in an ID3 tag in an MPEG file as discussed below with reference to FIG. 4. Storing (312) the extracted text (310) of the RSS content (304) as metadata (316) associated with the media file (314) may also be carried out by storing the extracted text in a metadata file associated with the media file such as by storing the extracted text in an eXtensible markup language ('XML') library file associated with an AAC compressed MPEG 4 file as discussed below with reference to FIG. 5.

The method of FIG. 3 also includes extracting (320) one or more images (322) from the RSS content (304). As discussed above, RSS content is typically presented in a web page or other markup document accessible through a browser. Such a web page or markup document therefore includes display text and images for display to a user and markup dictating the presentation of the content. Extracting (320) one or more images (322) from the RSS content (304) therefore may be carried out by retrieving images from a web page or markup document. Such images may be implemented as separate files referenced within the web page or markup document such as JPEG files, .pdf files, and others as will occur to those of skill in the art.

The method of FIG. 3 also includes storing (324) the extracted images (322) as metadata (316) associated with the media file (314). Storing (324) the extracted images (322) as metadata (316) associated with the media file (314) may be carried out by inserting the extracted images in the media file itself, such as by inserting the extracted images in an ID3 tag in an MPEG file as discussed below with reference to FIG. 4. Storing (324) the extracted images (322) as metadata (316) associated with the media file (314) may also be carried out by storing the extracted images in a metadata file associated with the media file such as by storing the extracted text in an eXtensible markup language ('XML') library file associated with an AAC compressed MPEG 4 file as discussed below with reference to FIG. 5.

The method of FIG. 3 also includes storing (323) the media file (314) on a digital audio player (108). Storing (323) the media file (314) on a digital audio player (108) may be carried out by copying the media file and associated metadata containing the extracted text onto the digital audio player.

The method of FIG. 3 also includes displaying (325) the metadata (316) describing the media file (314), the metadata (316) containing the extracted text (310) of the RSS content (304). Displaying (325) the metadata (316) describing the media file (314) is typically carried out by a digital audio player supporting the display of metadata associated with media files. Such digital audio players typically display, for example, metadata such as the artist and title a song stored in a media file of a media file type supported by the digital audio player. Storing extracted RSS content as metadata associated with a digital file advantageously allows the extracted RSS text to be displayed in a digital audio player that does not support rendering conventional RSS content.

In the example of FIG. 3, text is extracted from the RSS content itself and stored as metadata associated with the media file. In many embodiments, text may also be extracted from the RSS feed and also stored as metadata associated with the media file. Such extracted text may usefully be associated with predefined metadata fields such that the summaries and other metadata provided in the RSS feed are useful in navigating the stored RSS content on the digital audio player.

As discussed above, extracted RSS text and images may be stored directly in the media file. For further explanation, therefore, FIG. 4 sets forth a block diagram of an MPEG file (402) such as an .mp4 file. The MPEG file of FIG. 4 includes an audio portion (318) of the media file. The audio portion of the MPEG file includes the binary audio data.

Figure 4:
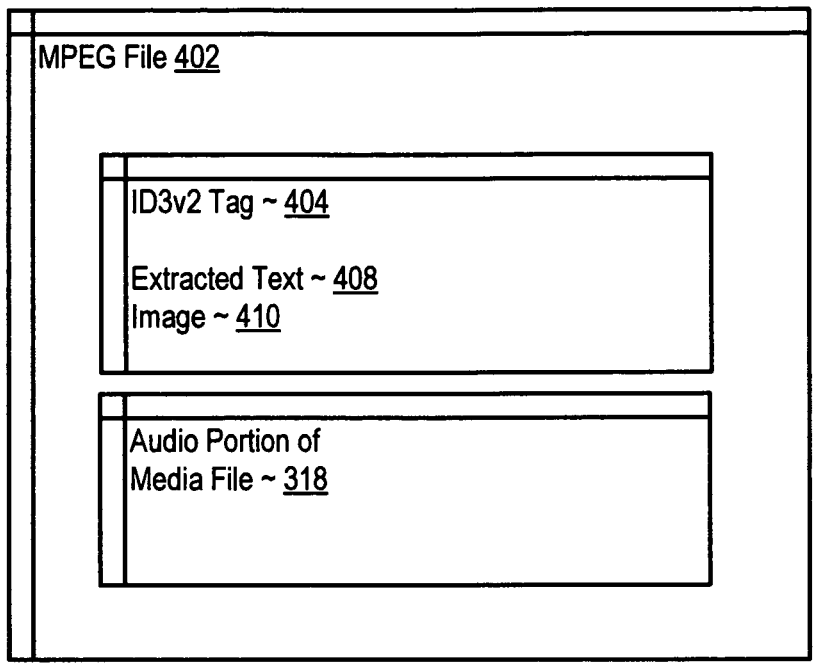
FIG. 4 sets forth a block diagram of an MPEG file such as an .mp4 file.

The MPEG file (402) of FIG. 4 has an ID3v2 tag (404) prepended to the audio portion (318) of the file that contains the extracted RSS text (408) and an image (410) extracted from the RSS content. An ID3v2 tag provides a container for metadata associated with the media file. An ID3v2 tag includes one or more frames supporting the inclusion of text, images, files, and other information. ID3v2 tags are flexible and expandable because parsers that do not support specific functions of the an ID3v2 tag will ignore those functions and respond only to supported functions. ID3v2 supports Unicode thereby providing the ability to include extracted RSS text of many different languages. The maximum tag size of an ID3v2 tag is typically 256 megabytes and maximum frame size is typically 16 megabytes.

Figure 5:
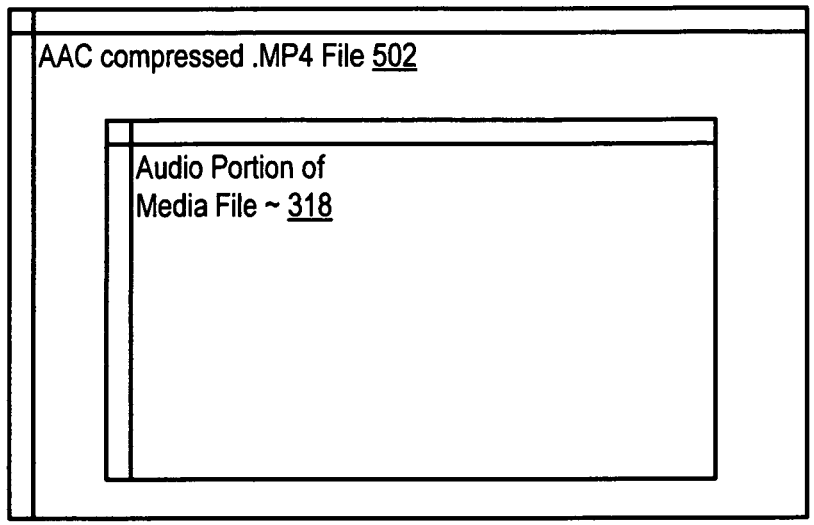
FIG. 5 sets forth a block diagram of an AAC compressed .mp4 file such as those supported by the iTunes musical jukebox and played on an iPod digital audio player.
Figure 5:
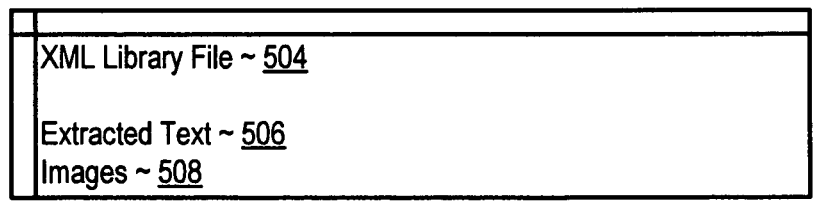

As discussed above, the extracted RSS text and images may also be associated with the media file in a metadata file. For further explanation, therefore, FIG. 5 sets forth a block diagram of an AAC compressed .mp4 file (502) such as those supported by the iTunes musical jukebox and played on an iPod digital audio player. In the example of FIG. 5 the AAC compressed .mp4 file has included in the file the binary audio portion (318) of the digital media file.

The AAC compressed .mp4 file (502) of FIG. 5 also has an associated metadata file implemented as an eXtensible markup language ('XML') library file (504) that includes the extracted text (506) and images (508) from the RSS content. iTunes digital audio application includes a single iTunes library file that contains metadata describing the contents of the media files comprising the iTunes library. The iTunes library file is implemented as an XML file, the format of which is defined by a flexible Document Type Definition ('DTD').

In the examples above, extracted RSS text and images are displayed on the display screen of a digital audio player for visual rendering of the RSS content on the display screen of a digital audio player. Some or all of the extracted text may also be converted to speech for audio rendering by the digital audio player. For further explanation, FIG. 6 sets forth a flow chart illustrating an exemplary method for RSS content administration for rendering RSS content on a digital audio player that includes converting the extracted RSS text to speech and recording the speech in the audio portion of a media file for audio playback on the digital audio file. The method of FIG. 6 includes retrieving (302), through an RSS feed, RSS content (304). Retrieving (302), through an RSS feed, RSS content (304) may be carried out by invoking one or more hyperlinks provided in the RSS feed and retrieving an RSS web page or other markup document containing the RSS content.

Figure 6:
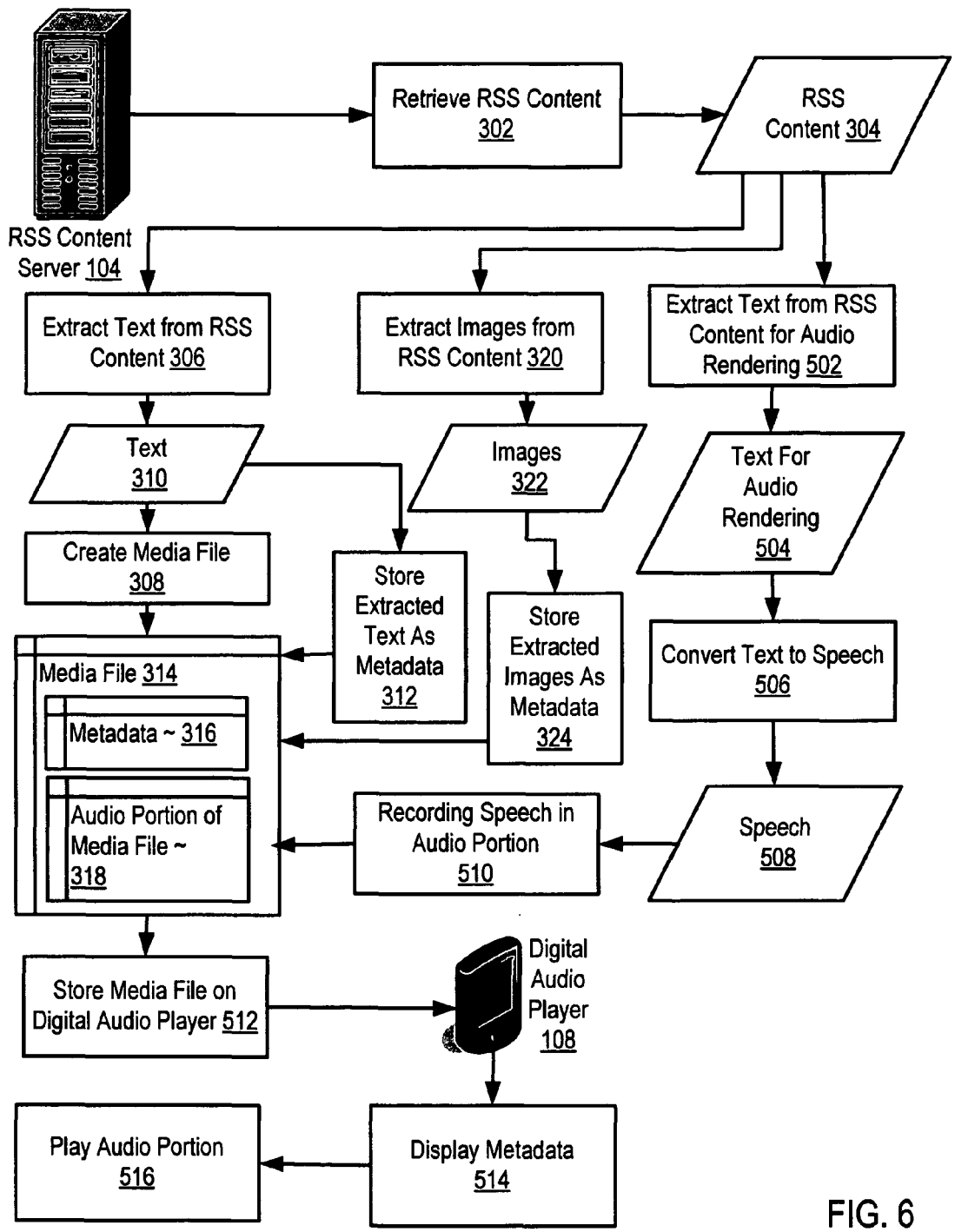
FIG. 6 sets forth a flow chart illustrating an exemplary method for RSS content administration for rendering RSS content on a digital audio player that includes converting a portion of the RSS text to speech and recording the speech in the audio portion of a media file for audio playback on the digital audio file.

The method of FIG. 6 includes extracting (306) text (310) from the RSS content (304). As discussed above, RSS content is typically presented in a web page or other markup document accessible through a browser. Such a web page or markup document therefore includes display text and images for display to a user and markup dictating the presentation of the content. Extracting (306) text (310) from the RSS content therefore may be carried out by retrieving display text from a web page or markup document. Such extracted display text implements some or all of the text content of the RSS feed. Examples of extracted text useful in visual presentation on the display screen of a digital audio player include the title of the RSS content of a summary of the content.

The method of FIG. 6 also includes creating (308) a media file (314). As discussed above, examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art. Creating a media file typically includes creating a media file that is supported by a digital audio player upon which RSS content is to be rendered.

The method of FIG. 6 also includes storing (312) the extracted text (310) of the RSS content (304) as metadata (316) associated with the media file (314). Storing (312) the extracted text (310) of the RSS content (304) as metadata (316) associated with the media file (314) may be carried out by inserting the extracted text in the media file itself, such as by inserting the extracted text in an ID3 tag in an MPEG file as discussed above with reference to FIG. 4. Storing (312) the extracted text (310) of the RSS content (304) as metadata (316) associated with the media file (314) may be also be carried out by storing the extracted text in a metadata file associated with the media file such as by storing the extracted text in an eXtenxible markup language ('XML') library file associated with an AAC compressed MPEG 4 file as discussed above with reference to FIG. 5.

The method of FIG. 6 also includes extracting (320) one or more images (322) from the RSS content (304). As discussed above, RSS content is typically presented in a web page or other markup document accessible through a browser. Such a web page or markup document therefore includes display text and images for display to a user and markup dictating the presentation of the content. Extracting (320) one or more images (322) from the RSS content (304) therefore may be carried out by retrieving images from a web page or markup document. Such images may be implemented as separate files referenced within the web page or markup document such as JPEG files, .pdf files, and others as will occur to those of skill in the art.

The method of FIG. 6 also includes storing (324) the extracted images (322) as metadata (316) associated with the media file (314). "Storing (324) the extracted images (322) as metadata (316) associated with the media file (314) may be carried out by inserting the extracted images in the media file itself, such as by inserting the extracted images in an ID3 tag in an MPEG file as discussed above with reference to FIG. 4. Storing (324) the extracted images (322) as metadata (316) associated with the media file (314) may also be carried out by storing the extracted images in a metadata file associated with the media file such as by storing the extracted text in an eXtenxible markup language ('XML') library file associated with an AAC compressed MPEG 4 file as discussed above with reference to FIG. 5.

The method of FIG. 6 also includes extracting (502) text from the RSS content (304) for audio rendering on the digital audio player (108). As discussed above, RSS content is typically presented in a web page or other markup document accessible through a browser. Such a web page or markup document therefore includes display text and images for display to a user and markup dictating the presentation of the content. Extracting (306) text (310) from the RSS content for audio rendering therefore may be carried out by retrieving display text from a web page or markup document for inclusion in the audio portion of the media file and stored for audio playback to user. Such extracted display text implements some or all of the text content of the RSS feed. Examples of extracted text usefully rendered as audio include the full body content of the RSS content.

The method of FIG. 6 also includes converting (506) the text (504) to speech (508) and recording (510) the speech (508) in the audio portion (318) of the media file (314). Converting (506) the text (504) to speech (508) and recording (510) the speech (508) in the audio portion (318) of the media file (314) may be carried out by processing the extracted text using a text-to-speech engine in order to produce a speech presentation of the extracted RSS content text and then recording the speech produced by the text-speech-engine in the audio portion of a media file.

Examples of speech engines capable of converting extracted text to speech for recording in the audio portion of a media filed include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis generates highly intelligible, but not completely natural sounding speech. However, formant synthesis has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they have the highest potential for sounding like natural speech, but concatenative systems require large amounts of database storage for the voice database.

The method of FIG. 6 also includes storing (512) the media file (314) on a digital audio player (108). Storing (512) the media file (314) on a digital audio player (108) may be carried out by copying the media file and associated metadata containing the extracted text onto memory of the digital audio player.

The method of FIG. 6 also includes displaying (514) the metadata (316) describing the media file (314). Displaying (514) the metadata (316) describing the media file (314) is typically carried out by a digital audio player supporting the display of metadata associated with media files. Such digital audio players typically display, for example, metadata such as the artist and title a song stored in a media file of a media file type supported by the digital audio player. Storing extracted RSS content as metadata associated with a digital file advantageously allows the extracted RSS text to be displayed in a digital audio player that does not support rendering conventional RSS content.

The method of FIG. 6 also includes playing (516) the audio portion (318) containing the speech (508). Playing (516) the audio portion (318) containing the speech (508) advantageously renders an audio speech representation of the extracted RSS text thereby allowing some or all of the RSS content to be rendered on a digital audio player that does not support rendering conventional RSS content.

In the example of FIG. 6, text is extracted from the RSS content itself and stored as metadata associated with the media file. In many embodiments, text may also be extracted from the RSS feed and also stored as metadata associated with the media file. Such extracted text may usefully be associated with predefined metadata fields such that the summaries and other metadata provided in the RSS feed are useful in navigating the stored RSS content on the digital audio player.

Exemplary embodiments of the present invention are described largely in the context of a fully functional computer system for RSS content administration for rendering RSS content on a digital audio player. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for RSS content administration for rendering RSS content on a digital audio player, the method comprising:
   retrieving, through an RSS feed, RSS content by invoking one or more hyperlinks provided in the RSS feed that points to the RSS content;
   extracting a portion of text from the RSS content, wherein said extracted text is a subset of text included in the RSS content;
   extracting one or more images from the RSS content;
   creating a media file including an audio portion containing no audible digital audio data that is related to the RSS content, wherein the media file comprises one of a digital audio file or a digital video file;
   storing the extracted text of the RSS content as metadata associated with the media file; and
   storing the extracted images as metadata associated with the media file.

2. The method of claim 1 wherein:
   creating a media file further comprises creating an MPEG file; and
   storing the extracted text of the RSS content as metadata associated with the media file further comprises inserting the extracted text in the MPEG file.

3. The method of claim 2 wherein inserting the extracted text in the MPEG file further comprises inserting the extracted text in an ID3 tag in the MPEG file.

4. The method of claim 1 wherein storing the extracted text of the RSS content as metadata associated with the media file further comprises storing the extracted text in a metadata file associated with the media file.

5. The method of claim 4 wherein the metadata file is an eXtenxible markup language ('XML') file.

6. The method of claim 1 further comprising:
   storing the media file on a digital audio player; and
   displaying the metadata associated with the media file, the metadata containing the extracted text of the RSS content.

7. The method of claim 1 wherein the RSS content is retrieved in a format that cannot be rendered by the digital audio player.

8. A system for RSS content administration for rendering RSS content on a digital audio player the system comprising:
   a computer processor;
   a computer memory operatively coupled to the computer processor, the computer memory having disposed within it computer program instructions capable of:
   retrieving, through an RSS feed, RSS content by invoking one or more hyperlinks provided in the RSS feed that points to the RSS content;
   extracting a portion of text from the RSS content, wherein said extracted text is a subset of text included in the RSS content;
   extracting one or more images from the RSS content;

creating a media file including an audio portion containing no audible digital audio data that is related to the RSS content, wherein the media file comprises one of a digital audio file or a digital video file;

storing the extracted text of the RSS content as metadata associated with the media file; and storing the extracted images as metadata associated with the media file.

9. The system of claim 8 wherein the computer memory also has disposed within it computer program instructions capable of:

creating an MPEG file; and inserting the extracted text in the MPEG file.

10. The system of claim 8 wherein the computer memory also has disposed within it computer program instructions capable of storing the extracted text in a metadata file associated with the media file.

11. A computer program product for RSS content administration for rendering RSS content on a digital audio player, the computer program product embodied on a non-transitory computer-readable recordable medium, the computer program product comprising:

computer program instructions for retrieving, through an RSS feed, RSS content by invoking one or more hyperlinks provided in the RSS feed that points to the RSS content;

computer program instructions for extracting a portion of text from the RSS content, wherein said extracted text is a subset of text included in the RSS content;

computer program instructions for extracting one or more images from the RSS content;

computer program instructions for creating a media file including an audio portion containing no audible digital audio data that is related to the RSS content, wherein the media file comprises one of a digital audio file or a digital video file;

computer program instructions for storing the extracted text of the RSS content as metadata associated with the media file; and computer program instructions for storing the extracted images as metadata associated with the media file.

12. The computer program product of claim 11 wherein:

computer program instructions for creating a media file further comprise computer program instructions for creating an MPEG file; and computer program instructions for storing the extracted text of the RSS content as metadata associated with the media file further comprise computer program instructions for inserting the extracted text in the MPEG file.

13. The computer program product of claim 11 wherein computer program instructions for storing the extracted text of the RSS content as metadata associated with the media file further comprise computer program instructions for storing the extracted text in a metadata file associated with the media file.

* * * * *